(12) United States Patent
Grall et al.

(10) Patent No.: US 11,428,190 B2
(45) Date of Patent: Aug. 30, 2022

(54) GRID-TYPE THRUST REVERSER FOR TURBOJET ENGINE

(71) Applicant: Safran Nacelles, Gonfreville l'Orcher (FR)

(72) Inventors: Loïc Grall, Gonfreville l'Orcher (FR); Alexis Heau, Gonfreville l'Orcher (FR); Benjamin Brebion, Gonfreville l'Orcher (FR); Sébastien Michel Thierry Guillemant, Gonfreville l'Orcher (FR); Mélody Seriset, Gonfreville l'Orcher (FR); Patrick Boileau, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 114 days.

(21) Appl. No.: 16/914,782

(22) Filed: Jun. 29, 2020

(65) Prior Publication Data
US 2021/0079871 A1   Mar. 18, 2021

Related U.S. Application Data

(63) Continuation of application No. PCT/FR2018/053463, filed on Dec. 20, 2018.

(30) Foreign Application Priority Data

Dec. 28, 2017 (FR) ...................................... 17/63328

(51) Int. Cl.
*F02K 1/70* (2006.01)
*F02K 1/80* (2006.01)
(Continued)

(52) U.S. Cl.
CPC ................ *F02K 1/70* (2013.01); *B64D 29/06* (2013.01); *B64D 29/08* (2013.01); *F02K 1/80* (2013.01);
(Continued)

(58) Field of Classification Search
CPC ..... F02K 1/70; F02K 1/80; F02K 1/72; B64D 29/06; B64D 29/08; F05D 2240/129
See application file for complete search history.

(56) References Cited

U.S. PATENT DOCUMENTS 8,800,262 B2   8/2014   Vauchel et al.
9,856,825 B2   1/2018   Gallet
(Continued)

FOREIGN PATENT DOCUMENTS

EP   2129901   12/2009
FR   2907759   5/2008
(Continued)

OTHER PUBLICATIONS

International Search Report for International Application PCT/FR2018/053463, dated Apr. 10, 2019.

*Primary Examiner* — Andrew H Nguyen
(74) *Attorney, Agent, or Firm* — Burris Law, PLLC

(57) ABSTRACT

A grid-type thrust reverser for a turbojet engine includes a moving O-shaped thrust reverser body that is generally cylindrical in shape around a longitudinal central axis (A) and includes an inner wall configured to delimit a cold air stream, with an inner structure that surrounds the turbojet engine, the movable thrust reverser body being mounted so as to be able to slide along the longitudinal central axis (A) between a direct jet position in which the outer cowl covers the thrust reverser grids, and a thrust-reversal position in which the outer cowl uncovers the thrust reverser grids. The movable thrust reverser body includes a first half-portion and a second half-portion that are mounted so as to each pivot about a longitudinal pivot axis (B), between a closed position and an open gullwing position for removing the turbojet engine, via the cradle.

12 Claims, 6 Drawing Sheets

(51) Int. Cl.
*B64D 29/06* (2006.01)
*B64D 29/08* (2006.01)

(52) U.S. Cl.
CPC .. *F05D 2220/323* (2013.01); *F05D 2240/129* (2013.01)

(56) References Cited

U.S. PATENT DOCUMENTS

| | | | |
|---|---|---|---|
| 2010/0001123 A1* | 1/2010 | Hillereau | B64D 29/06 244/54 |
| 2010/0107599 A1* | 5/2010 | Vauchel | B64D 29/08 60/226.2 |
| 2013/0220435 A1 | 8/2013 | James | |
| 2014/0000237 A1 | 1/2014 | Lucas et al. | |
| 2014/0027537 A1* | 1/2014 | Binks | F02K 1/09 239/265.35 |
| 2015/0098810 A1* | 4/2015 | Soria | B64D 29/06 415/200 |
| 2015/0143796 A1* | 5/2015 | Lacko | F02K 1/64 60/226.2 |
| 2016/0146156 A1* | 5/2016 | Crawford | F02K 1/72 239/265.27 |
| 2016/0169157 A1* | 6/2016 | Sawyers-Abbott | F02K 1/72 239/1 |
| 2016/0201600 A1 | 7/2016 | Charron et al. | |
| 2017/0240288 A1* | 8/2017 | Pautis | B64D 29/06 |
| 2018/0215477 A1* | 8/2018 | Lacko | B64D 27/26 |

FOREIGN PATENT DOCUMENTS

| | | |
|---|---|---|
| FR | 2911372 | 7/2008 |
| WO | 2019036053 | 2/2019 |

* cited by examiner

GRID-TYPE THRUST REVERSER FOR TURBOJET ENGINE

CROSS-REFERENCE TO RELATED APPLICATIONS

This application is a continuation of International Application No. PCT/FR2018/053463, filed on Dec. 20, 2018, which claims priority to and the benefit of FR 17/63328 filed on Dec. 28, 2017. The disclosures of the above applications are incorporated herein by reference.

FIELD

The present disclosure relates to a cascade thrust reverser for a turbojet engine intended to form at least one portion of a downstream section of a nacelle accommodating the turbojet engine. More particularly, the present disclosure concerns an O-type thrust reverser.

BACKGROUND

The statements in this section merely provide background information related to the present disclosure and may not constitute prior art.

In general, an aircraft is propelled by several turbojet engines each housed within a nacelle accommodating a set of auxiliary actuation devices relating to its operation and providing various functions when the turbojet engine is running or shut down.

In particular, these auxiliary actuation devices comprise a thrust reverser device.

A turbojet engine nacelle generally has a substantially tubular structure comprising an air inlet upstream of the turbojet engine, a middle section intended to surround a fan of the turbojet engine, a downstream section intended to surround the combustion chamber of the turbojet engine and possibly integrating thrust reversal means, and generally terminates in an ejection nozzle whose outlet is located downstream of the turbojet engine.

Modern nacelles are intended to accommodate a bypass turbojet engine adapted to generate through the blades of the rotating fan a hot air flow (primary flow) and a cold air flow (secondary flow) which circulates outside the turbojet engine through an annular passage, also called flow path, formed between a fairing of the turbojet engine and an inner wall of the nacelle. Both air flows are ejected from the turbojet engine by the rear of the nacelle.

During the landing of the aircraft, the function of a thrust reverser device is to improve the braking capability thereof by forwardly redirecting at least one portion of the air ejected by the turbojet engine. In this phase, the thrust reverser device obstructs at least one portion of the cold air flow path and directs this flow toward the front of the nacelle, thereby generating a counter-thrust which is added to the braking of the wheels and air-brakes of the aircraft.

In the case of a cascade thrust reverser, the deflection of the cold air flow is performed by cascade vanes, associated to thrust reverser flaps brought to block at least partially the circulation flow path of the cold flow.

There are known at least two types of thrust reversers, a D-type thrust reverser, called "D duct," and an O-type thrust reverser, called "O duct."

Typically, the D-type thrust reverser includes two half-structures, with a substantially semi-cylindrical shape, as shown in this FIG. 1.

The two D-shaped half-structures form an Outer Fixed Structure (OFS) and a concentric Inner Fixed Structure (IFS), surrounding a downstream section of the turbojet engine accommodating the gas generator, or engine, of the turbojet engine.

The inner and outer fixed structures define the flow path intended to channel the cold air flow that circulates outside the turbojet engine.

In addition, each half-structure carries a D-shaped half-cowl, the C-shaped half-cowls being slidably mounted between a direct jet position in which the half-cowls cover the thrust reverser cascades, and a thrust reversal position in which the half-cowls uncover the thrust reverser cascades.

Also, the two half-structures are pivotally mounted in a butterfly fashion on the pylon at the upper portion (at 12 O'clock) by hinges parallel to the longitudinal axis of the nacelle, between a closed position and a maintenance butterfly open position in order to enable access to the gas generator during maintenance operations.

This so-called D-type thrust reverser facilitates access to the turbojet engine when the two half-structures are open in a butterfly fashion in the maintenance open position and enable quick removal of the turbojet engine.

The O-type thrust reverser comprises a thrust reverser movable body in one single portion without any interruption at the lower portion, such a structure is described for example in French Patent No. FR 2 911 372.

The thrust reverser movable body has a generally cylindrical shape around a longitudinal axis and comprises an inner wall adapted to delimit the cold air flow path with an inner structure which surrounds the turbojet engine.

Thus, the sliding thrust reverser movable body is dissociated from the inner structure surrounding the engine.

The thrust reverser movable body also comprises an outer cowl.

The thrust reverser movable body is slidably mounted on the suspension pylon, along a longitudinal axis, between a direct jet position in which the outer cowl covers the thrust reverser cascades, a thrust reversal position in which the outer cowl uncovers the thrust reverser cascades.

A drawback of the O-type thrust reverser is the time period for a turbojet engine change operation.

Indeed, the turbojet engine change operation requires the removal of the thrust reverser movable body on a carriage, this removal being time-consuming.

Conversely, the absence of obstacle in the cold air flow path of the O-type thrust reverser improves the aerodynamic performance and the fuel consumption of the aircraft while enhancing the effectiveness of the thrust reverser.

Indeed, the D-type thrust reverser includes a connection, referenced as 9 in FIG. 1, between the inner structure and the inner structure, which extends in the cold air flow path.

SUMMARY

This section provides a general summary of the disclosure and is not a comprehensive disclosure of its full scope or all of its features.

The present disclosure aims in particular at providing a thrust reverser which combines the advantages of both types of thrust reversers presented hereinabove.

The present disclosure relates to a cascade thrust reverser for a turbojet engine intended to form at least one portion of a downstream section of a nacelle accommodating a turbojet engine, the thrust reverser including a front frame which is adapted to be mounted downstream of a fan casing and which supports thrust reverser cascades, an O-type thrust reverser movable body which has a generally cylindrical shape around a longitudinal central axis and which comprises an inner wall adapted to delimit a cold air flow path with an inner structure which surrounds the turbojet engine, and an outer cowl, the O-type thrust reverser movable body being slidably mounted along a longitudinal central axis between a direct jet position in which the outer cowl covers the thrust reverser cascades, a thrust reversal position in which the outer cowl uncovers the thrust reverser cascades, and a cradle which is designed so as to link an upper portion of the O-type thrust reverser movable body on a suspension pylon of the nacelle in order to provide sliding of the O-type thrust reverser movable body. The O-type thrust reverser movable body comprises a first half-portion and a second half-portion each being generally semi-cylindrical and are linked to one another in a lower portion of the O-type thrust reverser movable body, by a first dismountable link device, each of the first half-portion and second half-portion of the O-type thrust reverser movable body being pivotally mounted about a longitudinal pivot axis, between a closed position and a butterfly open position for removing the turbojet engine, via the cradle.

The thrust reverser according to the present disclosure allows combining the advantages of an O-shaped structure and the advantages of a D-shaped structure.

Indeed, the cold air flow path delimited by the O-type thrust reverser movable body is devoid of any connecting portions extending through the cold air flow path.

In addition, the O-type thrust reverser movable body according to the present disclosure is designed so as to occupy a butterfly open position which enables removal of the turbojet engine without having to remove the O-type thrust reverser movable body.

According to another form of the present disclosure, the outer cowl of the O-type thrust reverser movable body includes C-shaped first half-cowl and second half-cowl each being pivotally mounted about a longitudinal pivot axis, between a closed position and a maintenance butterfly open position.

Through its opening, the outer cowl allows accessing the turbojet engine for maintenance tasks.

According to yet another form of the present disclosure, a second dismountable link device slidably links the cascade vanes on the O-type thrust reverser movable body in a dismountable way.

This feature allows detaching the assembly formed by the thrust reverser cascades and the actuators, from the assembly formed by the O-type thrust reverser movable body.

According to another feature, the second dismountable link device is of the screw-nut type.

According to another feature, the first dismountable link device is of the screw-nut type.

According to another feature, the cradle includes a first half-cradle which carries the first half-portion of the O-type thrust reverser movable body and which is pivotally mounted on the pylon about the pivot axis of the first half-portion so as to provide pivoting of the first half-portion of the O-type thrust reverser movable body, and a second half-cradle which carries the second half-portion of the O-type thrust reverser movable body and which is pivotally mounted on the pylon about the pivot axis of the second half-portion so as to provide pivoting of the second half-portion of the O-type thrust reverser movable body.

According to another feature, the thrust reverser includes an anti-rotation device which is designed so as to pivotally lock the first half-portion and the second half-portion of the O-type thrust reverser movable body in their closed position.

According to another feature, the anti-rotation device includes a first lock which pivotally locks the first half-cradle on the pylon, and a second lock which pivotally locks the second half-cradle on the pylon.

According to another feature, the first half-cradle comprises a slide connection which slidably links the first half-portion of the O-type thrust reverser movable body on the pylon, and the second half-cradle comprises a slide connection which slidably links the second half-portion of the O-type thrust reverser movable body on the pylon.

According to another feature, the thrust reverser includes a plurality of actuators each linking the front frame of the thrust reverser on the cascade vanes and which are designed so as to slidably drive the assembly formed by the cascade vanes and the O-type thrust reverser movable body.

The present disclosure also concerns a nacelle for an aircraft turbojet engine including a thrust reverser of the previously described type.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 13:
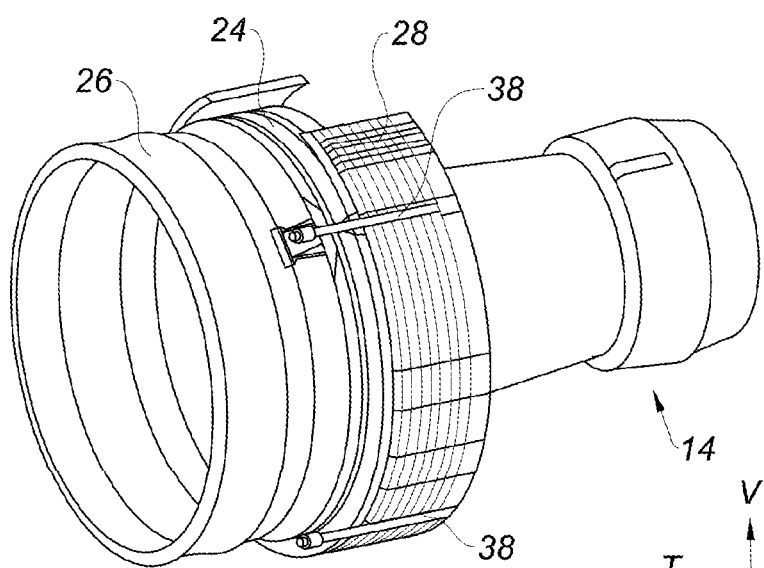
Figure 14:
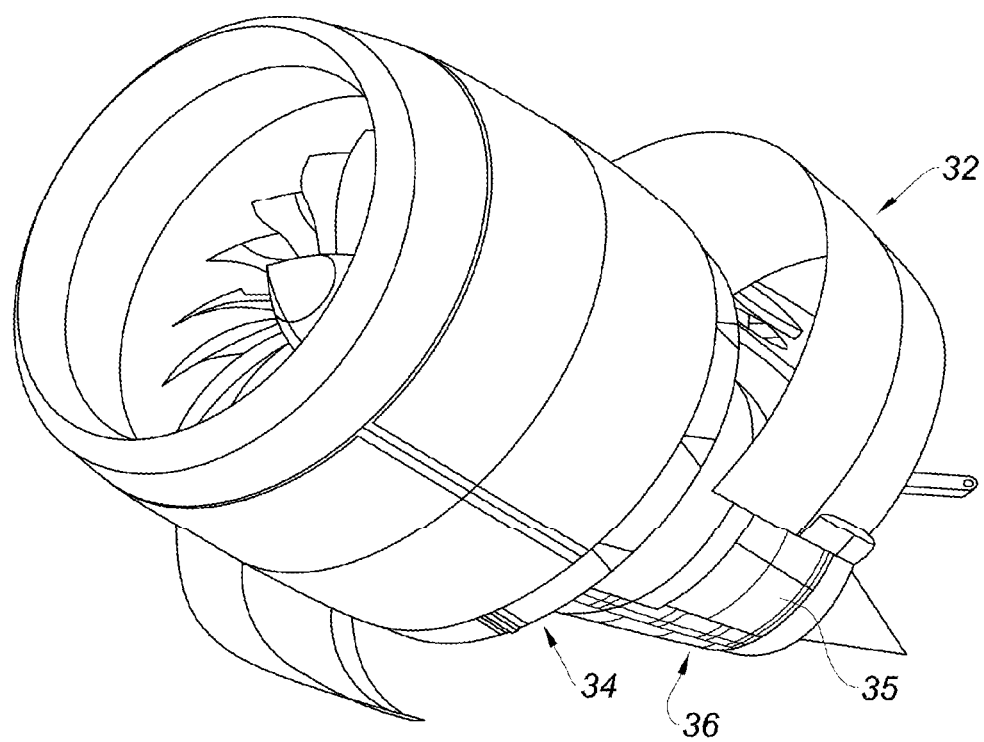

FIG. 13 is a perspective view illustrating the assembly that is removed during a turbojet engine removal operation, and which comprises in particular the turbojet engine, the cascade vanes and the actuators for driving the O-type thrust reverser movable body, according to the teachings of the present disclosure; and FIG. 14 is a perspective view illustrating the O-type thrust reverser movable body comprising an outer cowl, and an inner wall which delimits a cold air flow path with an inner structure which surrounds the turbojet engine, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the terminology longitudinal, vertical and transverse will be adopted in a non-limiting manner with reference to the trihedron L, V, T indicated in the figures, whose axis L is parallel to the axis of the nacelle.

In all of these figures, identical or similar reference numerals represent identical or similar members or sets of members.

Figure 1:
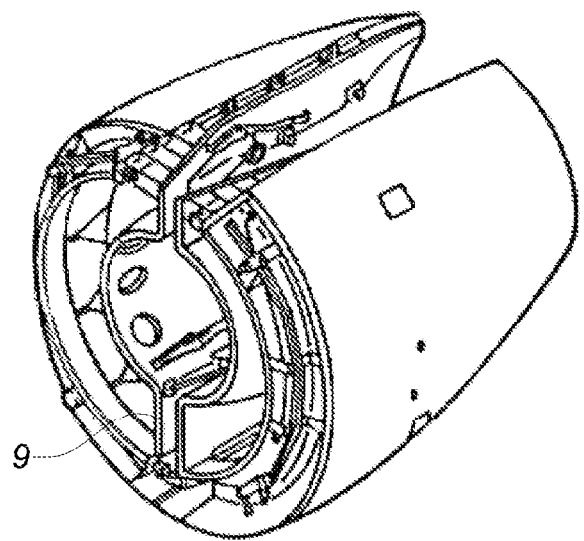
FIG. 1 is a rear perspective sectional view of a thrust reverser of a D-type nacelle, according to the prior art.
Figure 2:
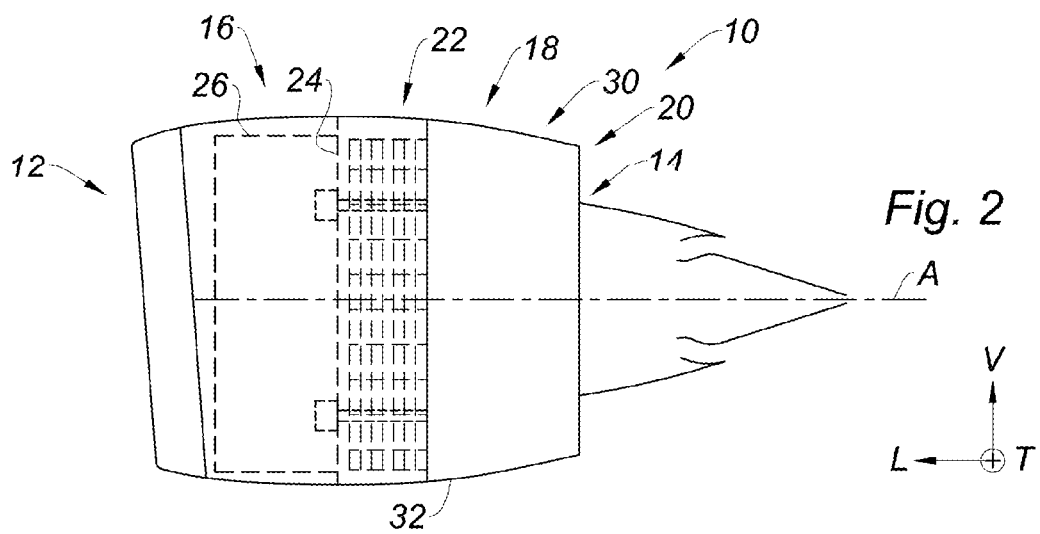
FIG. 2 is a schematic side view illustrating a nacelle including an O-type thrust reverser with a thrust reverser movable body in the direct jet position, according to the teachings of the present disclosure.

It should be noted that in the present patent application, the terms "upstream" and "downstream" should be understood with respect to the circulation of the air flow inside the propulsion unit formed by the nacelle and the turbojet engine, that is to say from left to right in FIG. 2.

In the present application, the terms "upper," "lower" and their derivatives refer to the position or the orientation of an element or a component, this position or this orientation being considered when the nacelle is in the service configuration on an aircraft on the ground.

Figure 3:
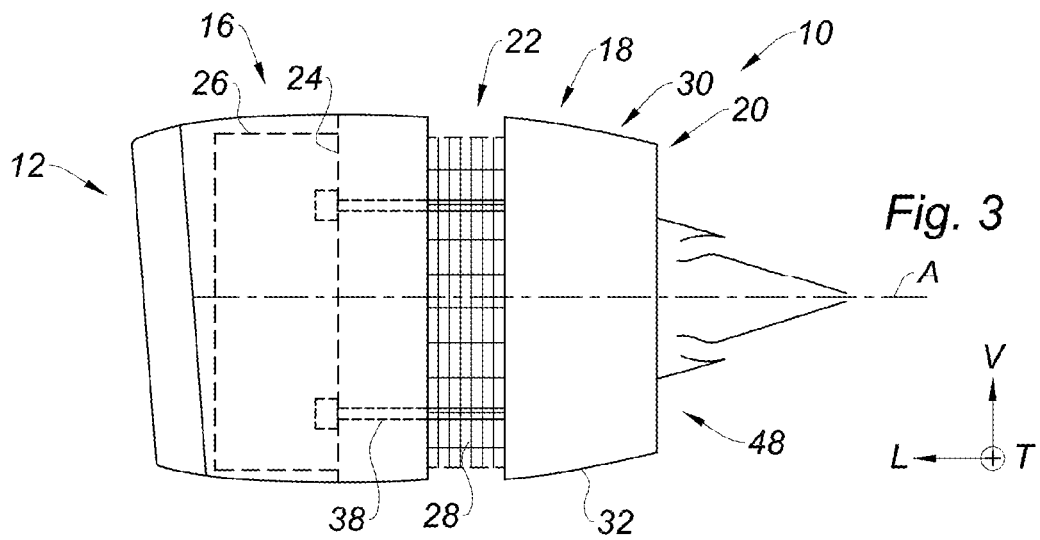
FIG. 3 is a schematic view similar to that of FIG. 2, illustrating the O-type thrust reverser movable body of FIG. 2 in a thrust reversal position.

In FIGS. 2 and 3, there is represented a nacelle 10 (for example, for a turbojet engine nacelle) which has a substantially tubular structure around a longitudinal central axis A.

The nacelle 10 comprises an air inlet 12 upstream of the turbojet engine 14, a middle section 16 intended to surround a fan of the turbojet engine, a downstream section 18 intended to surround the combustion chamber of the turbojet engine 14, the nacelle 10 terminating in an ejection nozzle 20 whose outlet is located downstream of the turbojet engine 14.

In addition, the downstream section 18 of the nacelle 10 includes a cascade thrust reverser 22.

The thrust reverser 22 includes a front frame 24 which is mounted downstream of the fan casing 26 and which supports thrust reverser cascades 28.

Also, the thrust reverser 22 includes an O-type thrust reverser movable body 30 which has a generally cylindrical shape around the longitudinal central axis A of the nacelle 10.

Figure 7:
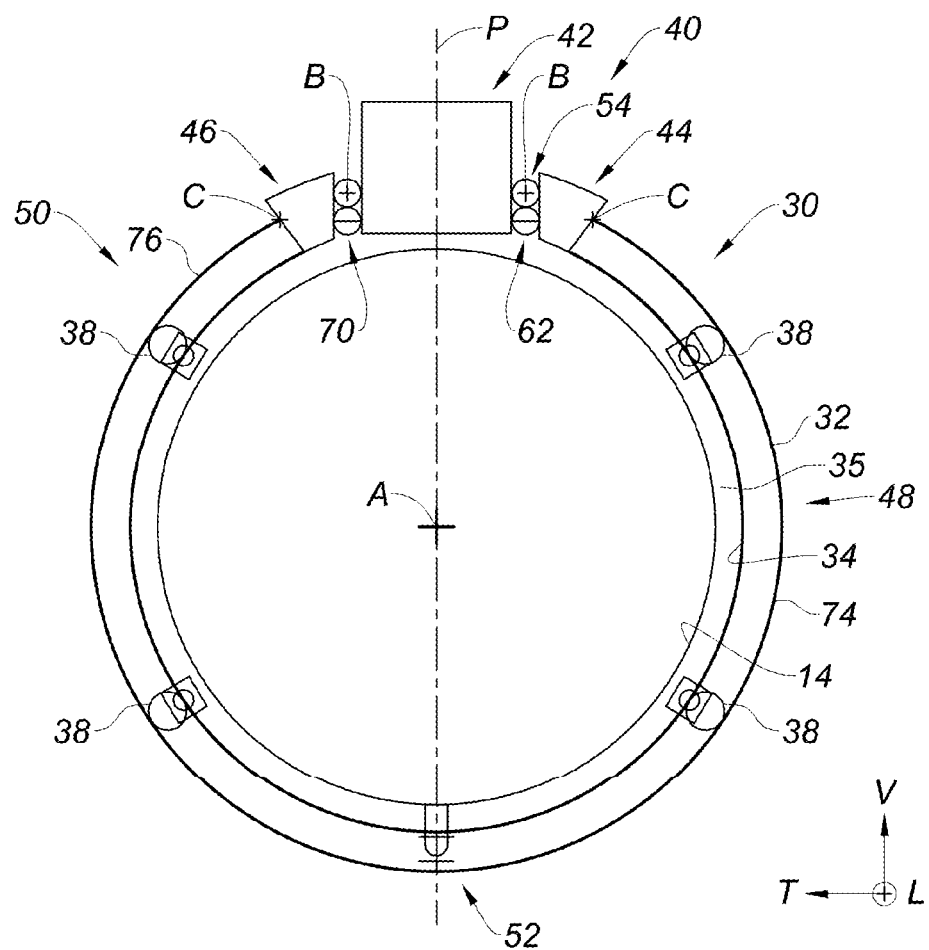
FIG. 7 is a schematic cross-sectional view illustrating the O-type thrust reverser movable body of FIG. 2 and the actuators for slidably driving the O-type thrust reverser movable body.

As shown in FIGS. 7 and 14, the O-type thrust reverser movable body 30 comprises an outer cowl 32 and an inner wall 34 which is adapted to delimit a cold air flow path 35 with an inner structure 36 which surrounds the turbojet engine 14.

The inner structure 36 is formed by half-cowls which are adapted so as to open in a butterfly fashion in order to allow access to the turbojet engine 14.

The O-type thrust reverser movable body 30 is slidably mounted along the longitudinal central axis A, between a direct jet position illustrated in FIG. 2, in which the outer cowl 32 covers the thrust reverser cascades 28, a thrust reversal position illustrated in FIG. 3, in which the outer cowl 32 uncovers the thrust reverser cascades 28.

To this end, as shown in particular in FIGS. 7 and 13, the thrust reverser 22 includes four cylinder-type actuators 38 (two of which are shown in FIG. 13), each linking the front frame 24 on a rear frame of the thrust reverser cascades 28 and which are designed so as to slidably drive the assembly formed by the thrust reverser cascades 28 and the O-type thrust reverser movable body 30 between its direct jet position and its thrust reversal position.

Also, the thrust reverser cascades 28 are linked on the O-type thrust reverser movable body 30, so that the thrust reverser cascades 28 are slidably driven with the O-type thrust reverser movable body 30 by the actuators 38. For this purpose, the thrust reverser cascades are slidably mounted on a guide track (not shown).

More particularly, the rear frame of the thrust reverser cascades 28 is linked on the O-type thrust reverser movable body 30.

Figure 11:
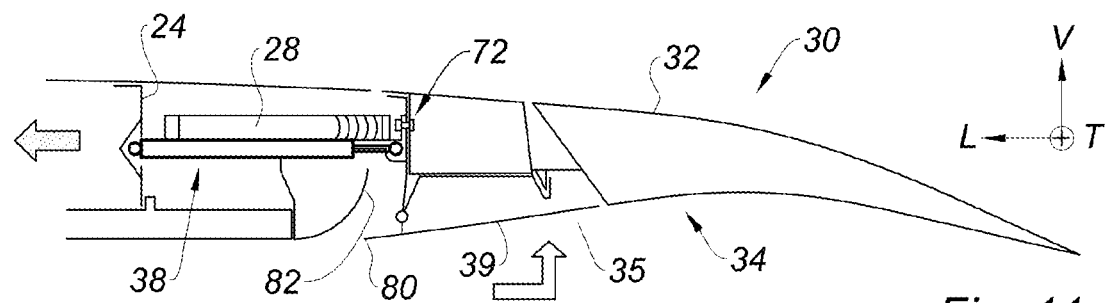
FIG. 11 is a schematic longitudinal sectional view illustrating the cascade vanes on the O-type thrust reverser movable body, which is in the direct jet reversal position, according to the teachings of the present disclosure.

As shown in FIG. 11, the O-type thrust reverser movable body 30 carries flaps 39 which are pivotally mounted within the cold air flow path 35, between a rest position illustrated in FIG. 11, which corresponds to the direct jet position of the O-type thrust reverser movable body 30, and a thrust reversal position (not represented), which corresponds to the thrust reversal position of the O-type thrust reverser movable body 30, in which the flaps 39 direct the air flow toward the thrust reverser cascades 28.

It should be noted that the thrust reverser 22, and the nacelle 10 in general, have a symmetrical design according to a plane P of symmetry, illustrated in FIG. 7, which extends vertically through the longitudinal central axis A of the nacelle 10.

The thrust reverser 22 comprises a cradle 40 which is partially shown in FIGS. 4 to 10, and which is designed so as to link an upper portion of the O-type thrust reverser movable body 30 on a suspension pylon 42 of the nacelle 10 in particular in order to provide sliding of the O-type thrust reverser movable body 30.

The cradle 40 includes a first half-cradle 44 and a second half-cradle 46 shown in FIG. 7, which is arranged symmetrically to the first half-cradle 44 and which is identical to the first half-cradle 44.

For brevity purposes, only the first half-cradle 44 is described later on.

Similarly, the O-type thrust reverser movable body 30 comprises a first half-portion 48 and a second half-portion 50 each being generally semi-cylindrical and are linked to one another in a lower portion of the O-type thrust reverser movable body 30, by a first dismountable link device 52.

The first dismountable link device 52 is of the screw-nut type. Nonetheless, without limitation, the first dismountable link device 52 comprise a lock or any other known dismountable link device.

More particularly, the first dismountable link device 52 comprises a first flange and a second flange which bear in vertical and longitudinal planes and which are linked to one another by screws.

The first half-portion 48 and the second half-portion 50 of the O-type thrust reverser movable body 30 are generally identical by symmetry according to the plane P of symmetry, so that only the first half-portion 48 of the O-type thrust reverser movable body 30 is described later on.

Figure 4:
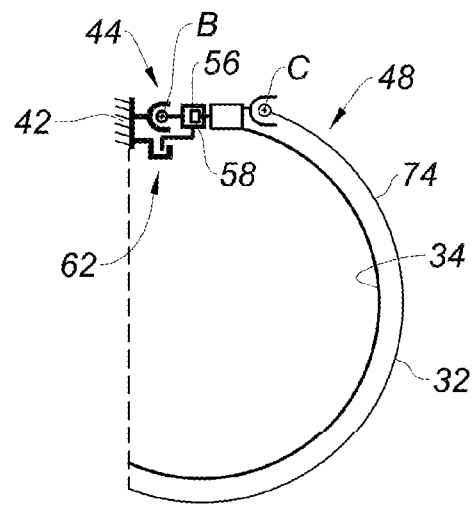
FIG. 4 is a schematic cross-sectional view illustrating the first half-portion of the O-type thrust reverser movable body of FIG. 2 in its closed position.
Figure 4:
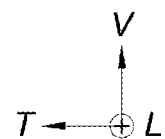
Figure 6:
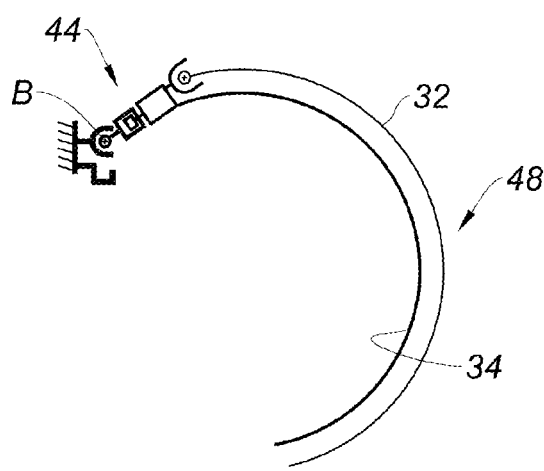
FIG. 6 is a schematic cross-sectional view illustrating the first half-portion of the O-type thrust reverser movable body of FIG. 2 in its butterfly open position.
Figure 6:
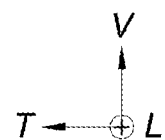
Figure 9:
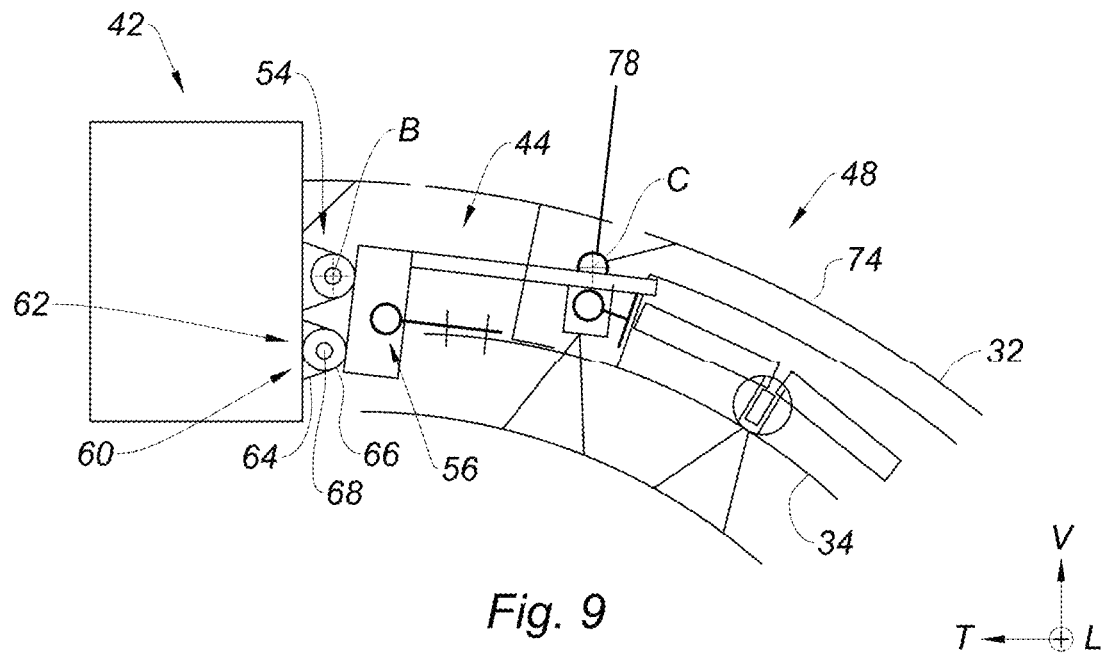
FIG. 9 is a schematic cross-sectional view illustrating the first half-cradle and the first half-portion of the O-type thrust reverser movable body in its closed position, according to the teachings of the present disclosure.
Figure 10:
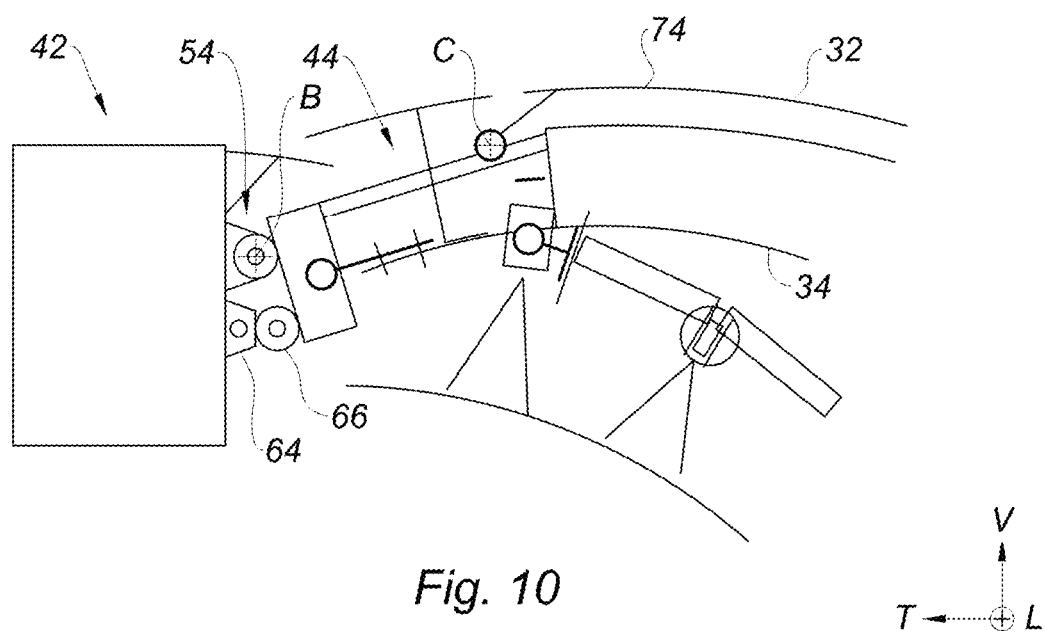
FIG. 10 is a schematic cross-sectional view illustrating the first half-cradle and the first half-portion of the O-type thrust reverser movable body in its butterfly open position, according to the teachings of the present disclosure.

Each of the first half-portion 48 and the second half-portion 50 of the O-type thrust reverser movable body 30 are pivotally mounted about a longitudinal pivot axis B, between a closed position illustrated in FIGS. 7, 4 and 9 and a butterfly open position for removing the turbojet engine 14, illustrated in FIGS. 6 and 10, via the cradle 40.

Figure 8:
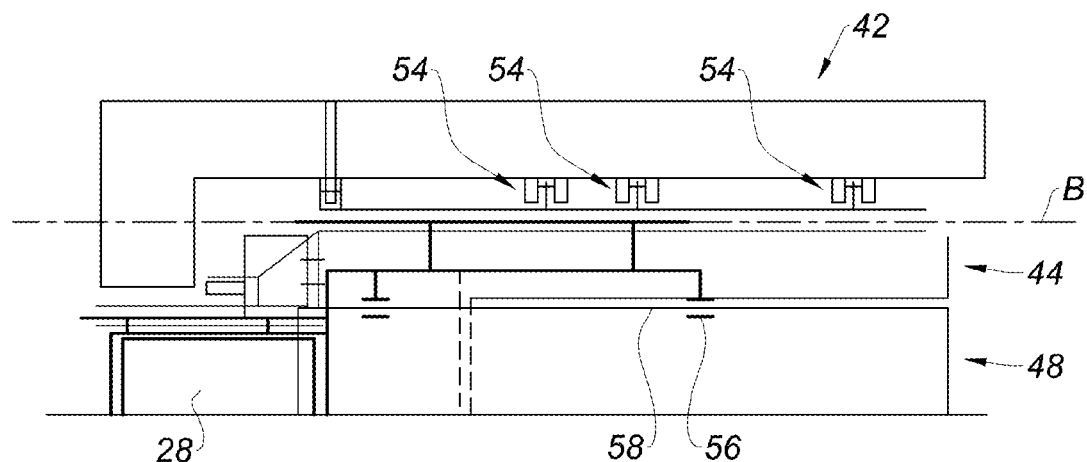
FIG. 8 is a schematic longitudinal sectional view illustrating a first half-cradle which links the first half-portion of the O-type thrust reverser movable body on the suspension pylon, according to the teachings of the present disclosure.

To this end, the first half-cradle 44 carries the first half-portion 48 of the O-type thrust reverser movable body 30, and the first half-cradle 44 is pivotally mounted on the suspension pylon 42 about the longitudinal pivot axis B, by three hinges 54 shown in FIG. 8, so as to provide pivoting of the first half-portion 48 of the O-type thrust reverser movable body 30.

In addition, referring to FIGS. 4, 8 and 9, the first half-cradle 44 includes a longitudinal slide 56 which cooperates with a rail 58 secured to the O-type thrust reverser movable body 30, so as to enable sliding of the O-type thrust reverser movable body 30 between its direct jet position and its thrust reversal position.

In order to pivotally lock the first half-portion 48 and the second half-portion 50 of the O-type thrust reverser movable body 30, in their closed position, the thrust reverser 22 includes an anti-rotation device 60 illustrated in FIGS. 9 and 10.

The anti-rotation device 60 includes a first lock 62 which comprises a clevis 64 secured to the suspension pylon 42 and an eyelet 66 secured to the first half-cradle 44.

In addition, a removable pin 68 cooperates with the eyelet 66 and the clevis 64 so as to lock the first half-cradle 44 on the pylon, removal of the pin 68 enables rotatably releasing the first half-cradle 44.

By symmetry according to the plane P, the thrust reverser 22 includes a second lock 70 shown in FIG. 7 which pivotally locks the second half-cradle 46 on the suspension pylon 42.

According to another aspect illustrated in FIG. 11, the thrust reverser 22 includes a second dismountable link device 72 which slidably links the thrust reverser cascades 28 on the O-type thrust reverser movable body 30 in a dismountable manner.

The second dismountable link device 72 is of the screw-nut type. Nonetheless, without limitation, the second dismountable link device 72 comprises a lock or any other known dismountable link device.

Figure 5:
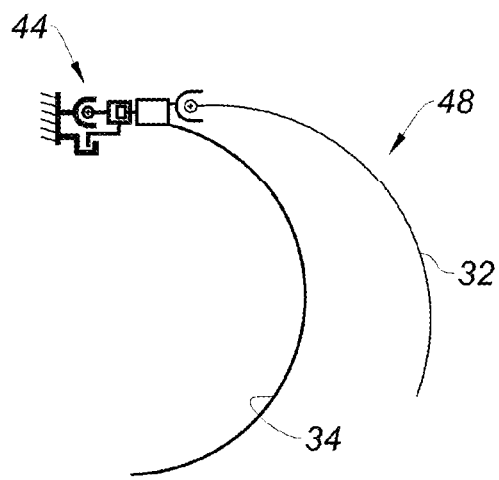
FIG. 5 is a schematic cross-sectional view illustrating the first half-portion of the O-type thrust reverser movable body of FIG. 2 in its closed position and an outer cowl in the butterfly open position.
Figure 5:
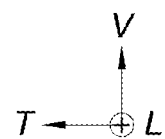

According to another aspect, the outer cowl 32 of the O-type thrust reverser movable body 30 includes C-shaped first half-cowl 74 and second half-cowl 76 each being pivotally mounted about a longitudinal pivot axis C, between a closed position illustrated in FIG. 4, and a maintenance butterfly open position, illustrated in FIG. 5.

To this end, as shown in FIG. 8, the structure of the first half-portion 48 of the O-type thrust reverser movable body 30 includes two hinges 78 which provide pivoting of the C-shaped first half-cowl 74.

The thrust reverser 22 according to the present disclosure enables a quick removal of the assembly formed by the turbojet engine 14, the thrust reverser cascades 28 and the actuators 38 shown in FIG. 13.

Figure 12:
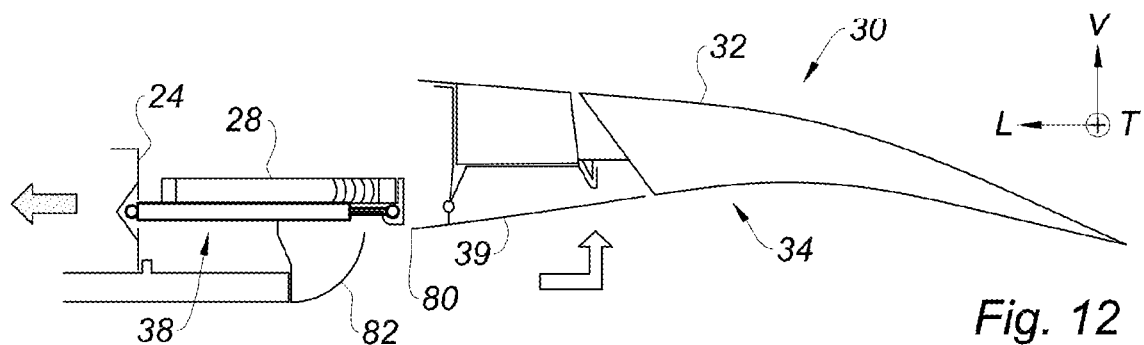
FIG. 12 is a schematic view similar to that of FIG. 11 illustrating the O-type thrust reverser movable body detached from the cascade vanes, according to the teachings of the present disclosure.

For this purpose, a first step comprises sliding the O-type thrust reverser movable body 30 rearward from its direct jet position illustrated in FIG. 11, up to a removal position illustrated in FIG. 12 in which the front edge 80 of the flaps 39 is cleared from the diverting edge 82 during opening of the O-type thrust reverser movable body 30 in a butterfly fashion.

In a second step, the second dismountable link device 72 which slidably links the thrust reverser cascades 28 on the O-type thrust reverser movable body 30 is dismounted so as to release the assembly formed by the O-type thrust reverser movable body 30, the cradle 40 and the flaps 39.

In a third step, the anti-rotation device 60 is unlocked so as to pivotally release the first half-portion 48 and the second half-portion 50 of the O-type thrust reverser movable body 30.

Finally, in a fourth step, the first half-portion 48 and the second half-portion 50 of the O-type thrust reverser movable body 30 are pivotally driven from their closed position, up to their butterfly open position for removing the turbojet engine 14.

The prior description of the present disclosure is provided as a non-limiting example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cascade thrust reverser for a turbojet engine configured to form at least one portion of a downstream section of a nacelle accommodating the turbojet engine, the cascade thrust reverser comprising:
    a front frame adapted to be mounted downstream of a fan casing and supporting thrust reverser cascades;
    an O-type thrust reverser movable body having a cylindrical shape around a longitudinal central axis and comprising an inner wall adapted to delimit a cold air flow path with an inner structure, the cold flow path devoid of any connecting portions extending therethrough, the inner structure surrounding the turbojet engine, and an outer cowl, the O-type thrust reverser movable body being slidably mounted along the longitudinal central axis between a direct jet position in which the outer cowl covers the thrust reverser cascades, and a thrust reversal position in which the outer cowl uncovers the thrust reverser cascades; and
    a cradle which is configured to link an upper portion of the O-type thrust reverser movable body on a suspension pylon of the nacelle to provide sliding of the O-type thrust reverser movable body,
    wherein the O-type thrust reverser movable body comprises a first half-portion and a second half-portion, each of the first half-portion and the second half-portion being semi-cylindrical and linked to one another in a lower portion of the O-type thrust reverser movable body by a first dismountable link device, each of the first half-portion and the second half-portion of the O-type thrust reverser movable body being pivotally mounted about a longitudinal pivot axis, between a closed position and a butterfly open position for removing the turbojet engine, via the cradle.

2. The cascade thrust reverser according to claim 1, wherein the outer cowl of the O-type thrust reverser movable body comprises a C-shaped first half-cowl and a C-shaped second half-cowl, each of the C-shaped first half-cowl and the C-shaped second half-cowl being pivotally mounted about a longitudinal pivot axis C, between a closed position and a maintenance butterfly open position.

3. The cascade thrust reverser according to claim 1, further comprising a second dismountable link device which slidably links the thrust reverser cascades on the O-type thrust reverser movable body.

4. The cascade thrust reverser according to claim 3, wherein the second dismountable link device is a screw-nut type dismountable link device.

5. The cascade thrust reverser according to claim 1, wherein the first dismountable link device is a screw-nut type dismountable link device.

6. The cascade thrust reverser according to claim 1, wherein the cradle comprises:
- a first half-cradle carrying the first half-portion of the O-type thrust reverser movable body and pivotally mounted on the suspension pylon about the longitudinal pivot axis B of the first half-portion configured to provide pivoting of the first half-portion of the O-type thrust reverser movable body; and
- a second half-cradle carrying the second half-portion of the O-type thrust reverser movable body and pivotally mounted on the suspension pylon about the longitudinal pivot axis of the second half-portion so as to provide pivoting of the second half-portion of the O-type thrust reverser movable body.

7. The cascade thrust reverser according to claim 6, wherein the cascade thrust reverser comprises an anti-rotation device configured to pivotally lock the first half-portion and the second half-portion of the O-type thrust reverser movable body in the closed position, and wherein the anti-rotation device comprises:
- a first lock which locks the first half-cradle pivotally on the suspension pylon; and
- a second lock which locks the second half-cradle pivotally on the suspension pylon.

8. The cascade thrust reverser according to claim 6, wherein the first half-cradle comprises a slide connection which slidably links the first half-portion of the O-type thrust reverser movable body on the suspension pylon, and the second half-cradle comprises a slide connection which slidably links the second half-portion of the O-type thrust reverser movable body on the suspension pylon.

9. The cascade thrust reverser according to claim 1, wherein the cascade thrust reverser comprises an anti-rotation device configured to pivotally lock the first half-portion and the second half-portion of the O-type thrust reverser movable body in the closed position.

10. The cascade thrust reverser according to claim 1, wherein the cascade thrust reverser comprises a plurality of actuators, each actuator of the plurality of actuators linking the front frame of the thrust reverser on the thrust reverser cascades and configured to slidably drive the thrust reverser cascades and the O-type thrust reverser movable body.

11. The cascade thrust reverser according to claim 1, wherein the O-type thrust reverser movable body is detached from the inner structure.

12. A nacelle for an aircraft turbojet engine comprising a cascade thrust reverser according to claim 1.

* * * * *